(12) United States Patent
Vanahalli et al.

(10) Patent No.: US 10,834,170 B2
(45) Date of Patent: Nov. 10, 2020

(54) CLOUD AUTHENTICATED OFFLINE FILE SHARING

(71) Applicant: Citrix Systems, Inc., Fort Lauderdale, FL (US)

(72) Inventors: Satish Vanahalli, Bengaluru (IN); Chirag Agarwal, Bengaluru (IN); Arnav Akhoury, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 242 days.

(21) Appl. No.: 15/924,771

(22) Filed: Mar. 19, 2018

(65) Prior Publication Data
US 2019/0289059 A1    Sep. 19, 2019

(51) Int. Cl.
| | | |
|---|---|---|
| *H04L 29/08* | (2006.01) | |
| *H04L 29/06* | (2006.01) | |
| *H04L 9/08* | (2006.01) | |
| *G06F 21/44* | (2013.01) | |
| *H04W 12/00* | (2009.01) | |
| *H04W 76/14* | (2018.01) | |
| *H04W 84/12* | (2009.01) | |

(52) U.S. Cl.
CPC .............. *H04L 67/06* (2013.01); *G06F 21/44* (2013.01); *H04L 9/0861* (2013.01); *H04L 63/061* (2013.01); *H04L 67/141* (2013.01); *H04W 12/003* (2019.01); *H04W 76/14* (2018.02); *H04L 67/104* (2013.01); *H04W 84/12* (2013.01)

(58) Field of Classification Search
CPC ........ H04L 67/06; H04L 63/061; G06F 21/44
See application file for complete search history.

(56) References Cited

U.S. PATENT DOCUMENTS

| | | | | |
|---|---|---|---|---|
| 10,362,452 | B2 * | 7/2019 | Chaki ................ | H04L 67/1051 |
| 10,530,856 | B2 * | 1/2020 | Verma ................ | H04N 21/40 |
| 10,567,479 | B2 * | 2/2020 | Tal ..................... | H04W 12/04 |
| 2010/0257251 | A1 | 10/2010 | Mooring et al. | |
| 2013/0034082 | A1 | 2/2013 | Etemad et al. | |
| 2013/0073671 | A1 | 3/2013 | Nagpal et al. | |

(Continued)

OTHER PUBLICATIONS

International Search Report and Written Opinion for International Appl. No. PCT/US2019/022083, dated May 13, 2019.

*Primary Examiner* — Shin-Hon (Eric) Chen
*Assistant Examiner* — Viral S Lakhia
(74) *Attorney, Agent, or Firm* — Banner & Witcoff, Ltd.

(57) ABSTRACT

Described embodiments provide systems and methods for transferring a file. A sender device configured to transfer a file to a receiver device may send an identifier of the receiver device and a public key to a server via a first network. The sender device may receive, via the first network prior to disconnecting from the first network, a session token from the server. The session token and the public key may be sent to the receiver device via the first network. The sender device may detect, after receiving the session token, a peer-to-peer (P2P) wireless network established by the receiver device. The P2P wireless network may broadcast a service set identifier (SSID) with a network key encrypted using the public key. The sender device may connect, using the network key, to the P2P wireless network to transfer the file to the receiver device via the P2P wireless network.

18 Claims, 7 Drawing Sheets

(56) References Cited

U.S. PATENT DOCUMENTS

| | | | | |
|---|---|---|---|---|
| 2015/0289295 A1* | 10/2015 | Granbery | ............... | H04B 5/04 |
| | | | | 370/230 |
| 2015/0296004 A1* | 10/2015 | Goel | ................ | H04L 67/104 |
| | | | | 709/204 |
| 2015/0304391 A1* | 10/2015 | Yu | ................ | G06F 16/176 |
| | | | | 709/204 |
| 2016/0021007 A1* | 1/2016 | Shuman | ............. | H04W 76/23 |
| | | | | 370/235 |
| 2016/0065571 A1* | 3/2016 | Hoyos | ............... | H04L 63/0861 |
| | | | | 713/168 |
| 2016/0308843 A1* | 10/2016 | Cassel | ................. | G06Q 20/40 |
| 2017/0063566 A1* | 3/2017 | Seminario | ............ | H04L 63/029 |
| 2017/0195386 A1* | 7/2017 | Nathan | .............. | H04L 65/4084 |
| 2017/0230453 A1* | 8/2017 | Verma | ................ | H04W 76/14 |
| 2018/0176845 A1* | 6/2018 | Visuri | ............. | H04W 36/0072 |
| 2018/0343547 A1* | 11/2018 | Chaki | ............... | H04L 67/1068 |
| 2018/0367597 A1* | 12/2018 | Kolli | ..................... | H04L 67/06 |
| 2020/0053072 A1* | 2/2020 | Glozman | ............ | H04L 9/3215 |

\* cited by examiner

US 10,834,170 B2

CLOUD AUTHENTICATED OFFLINE FILE SHARING

FIELD OF THE DISCLOSURE

The present application generally relates to transferring of files, including but not limited to systems and methods for authenticated transfer or sharing of files via an ad-hoc network.

BACKGROUND

Data may be transferred between multiple devices. When the data is transferred directly from one device to the other device without any additional protective measures, the participant devices and the data may be vulnerable to security breaches and malicious attacks. Such protective measures can be provided by a server that operates as a security gateway. The inclusion of a server for facilitating the transfer of a file, however, may lead to increase in consumption of network bandwidth and computing resources as well as additional maintenance considerations.

BRIEF SUMMARY

The present disclosure is directed towards systems and methods of secure authentication for offline file transfers. A file on a sender device may be transferred from the sender device to a receiver device. The transfer of the file may be performed directly via an ad hoc network, such as a peer-to-peer (P2P) network connection established between the sender and receiver devices. The ad hoc network may allow for fast transfer of files with speeds of up to 250 megabits per second (Mbps). Under alternative techniques, the file may be transferred without any additional protective measures, thereby exposing the sender device, the receiver device, and the file to security breaches and attacks. To protect against such vulnerabilities, a server such as a server of a cloud service may be used to provide or perform the protective measures (e.g., authentication and verification). The server may also facilitate the transfer of files by connecting to the sender and receiver devices via the server's network (e.g., a public network), downloading the file from the sender device, and then sending the file to the receiver device upon request. While providing certain protection against security breaches, the inclusion of the server may result in a significant increase of consumption of bandwidth, processing resources, and power as well as network complexity and maintenance overhead. Furthermore, the transfer of the file from the sender device to the receiver device via the server may be limited by the connection speed of the server's network.

To address challenges with security arising from transferring files via public networks and increase in network complexity from using a server, the present systems and methods provide a secure authentication mechanism for offline sharing of files. Both the sender device and the receiver device may initially be connected to the server via a public or other network (e.g., the Internet). For a sender device to send the file to the receiver device, the sender device may authenticate with the server. The sender device may provide the server an identifier for the receiver device (e.g., an email address for a user of the receiver device). The sender device may also generate an asymmetric key pair including a private key and a public key, and may send the public key to the server. Using the public key and the identifier for the receiver device received from the sender device, the server may generate a session token, and may transmit the session token to both the sender device and the receiver device via the public network. The server may also send the public key to the receiver device.

Upon receipt of the session token, the sender device and the receiver device may each disconnect from the public network and can establish an ad hoc network (e.g., P2P network) to transfer the file. To initiate the establishment of the ad hoc network, the receiver device may parse a received message comprising the session token to identify the public key. The receiver device may generate a service set identifier (SSID) for the ad hoc network (e.g., in accordance with Wi-Fi direct), and may append the public key identified from the session token to the SSID. The receiver device may then broadcast the SSID appended with the public key. In parallel, having disconnected from the public network, the sender device may search or discover for ad hoc networks. When the SSID appended with the public key is received by the sender device, the sender device may decrypt the SSID appended with the public key using the local copy of the private key. Once decrypted, the sender device may connect with the receiver device via the ad hoc network. The sender device and the receiver device may each perform an authentication handshake by exchanging and/or comparing copies of the session token received from the server. If the copies of the session tokens match, the sender device and the receiver device may each determine that the authentication is successful. Once authenticated, the sender device may commence sending of the file to the receiver device. After completion of the transfer of the file, the receiver device may terminate broadcasting the ad-hoc network, thereby disconnecting from the sender device. As the ad hoc network is used to complete the transfer of files, the files may be transferred at high speeds relative to speeds attainable via public networks such as the Internet.

At least one aspect of this disclosure is directed to a method for transferring a file. A sender device configured to transfer a file to a receiver device may send an identifier of the receiver device and a public key to a server via a first network that connects at least the sender device, the server and the receiver device. The sender device may receive, via the first network prior to disconnecting from the first network, a session token from the server. The session token and the public key may be sent to the receiver device via the first network. The sender device may detect, after receiving the session token, a peer-to-peer (P2P) wireless network established by the receiver device. The P2P wireless network may broadcast a service set identifier (SSID) with a network key encrypted using the public key. The sender device may connect, using the network key, to the P2P wireless network to transfer the file to the receiver device via the P2P wireless network.

In some embodiments, the sender device may generate a key pair comprising the public key and a private key. In some embodiments, the sender device may obtain the network key from the broadcasted SSID, by using the private key to perform decryption. In some embodiments, the sender device may receive the session token from the server responsive to the sender device and the receiver device being authenticated with the server. In some embodiments, the sender device may cause the server to generate the session token and to send the session token to the sender device and the receiver device, by sending the identifier of the receiver device and the public key to the server.

In some embodiments, the sender device may disconnect, from the first network, responsive to receiving the session token. In some embodiments, the sender device may authenticate with the receiver device using the session token, responsive to connecting to the P2P wireless network. In some embodiments, the sender device may transfer, responsive to authenticating with the receiver device, the file to the receiver device via the P2P wireless network. In some embodiments, the P2P wireless network may be terminated upon completion of the transfer of the file from the sender device to the receiver device. In some embodiments, the first network may include an Internet and the P2P wireless network may include a Wi-Fi Direct network.

At least one aspect of this disclosure is directed to a system for transferring a file. The system may include a transceiver of a sender device. The sender device may be configured to transfer a file to a receiver device. The system may include a peer-to peer (P2P) engine executable on the sender device. The P2P engine may send, using the transceiver, an identifier of the receiver device and a public key to a server via a first network that connects at least the sender device, the server and the receiver device. The P2P engine may receive, using the transceiver via the first network prior to the sender device disconnecting from the first network, a session token from the server. The session token and the public key may be sent to the receiver device via the first network. The P2P engine may detect, after receiving the session token, a P2P wireless network established by the receiver device. The P2P wireless network may broadcast a service set identifier (SSID) with a network key encrypted using the public key. The P2P engine may connect, using the network key, the sender device to the P2P wireless network to transfer the file to the receiver device via the P2P wireless network.

In some embodiments, the P2P engine may generate a key pair comprising the public key and a private key. In some embodiments, the P2P engine may obtain the network key from the broadcasted SSID, by using the private key to perform decryption. In some embodiments, the transceiver may receive the session token from the server responsive to the sender device and the receiver device being authenticated with the server. In some embodiments, the P2P engine may cause the server to generate the session token and to send the session token to the sender device and the receiver device, by sending the identifier of the receiver device and the public key to the server.

In some embodiments, the P2P engine may disconnect the sender device from the first network, responsive to receiving the session token. In some embodiments, the system may include an authentication engine executable on the sender device. The authentication engine may authenticate the sender device with the receiver device using the session token, responsive to the sender device connecting to the P2P wireless network. In some embodiments, the transceiver may transfer, responsive to the sender device authenticating with the receiver device, the file to the receiver device via the P2P wireless network. In some embodiments, the P2P wireless network may be terminated upon completion of the transfer of the file from the sender device to the receiver device. In some embodiments, the first network may include an Internet and the P2P wireless network may include a Wi-Fi Direct network.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
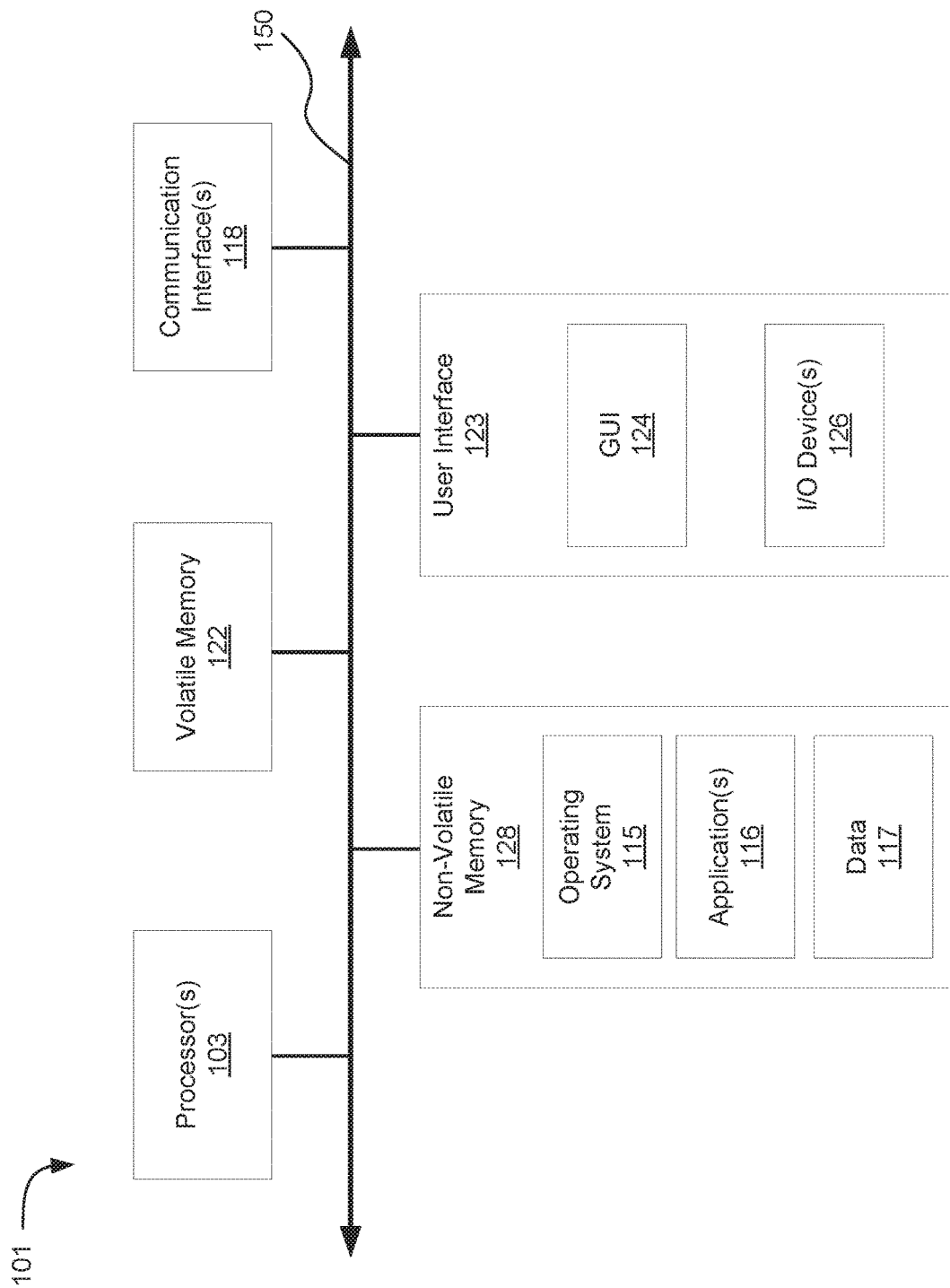
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes systems and methods for authenticated transfer of files.

A. Computing Environment

Prior to discussing the specifics of embodiments of the systems and methods detailed herein in Section B, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Authenticated Transfer of Files

The present disclosure is directed towards systems and methods for offline file transfer. A file on a sender device may be transferred from the sender device to a receiver device. The transfer of the file may be performed directly via an ad hoc network, such as a peer-to-peer (P2P) network connection established between the sender and receiver devices. The ad hoc network may allow for fast transfer of files with speeds of up to 250 megabits per second (Mbps). Under alternative techniques, the file may be transferred without any additional protective measures, thereby exposing the sender device, the receiver device, and the file to security breaches and attacks. To protect against such vulnerabilities, a server such as a server of a cloud service may be used to provide or perform the protective measures (e.g., authentication and verification). The server may also facilitate the transfer of files by connecting to the sender and receiver devices via the server's network (e.g., a public network), downloading the file from the sender device, and then sending the file to the receiver device upon request. While providing certain protection against security breaches, the inclusion of the server may result in a significant increase of consumption of bandwidth, processing resources, and power as well as network complexity and maintenance overhead. Furthermore, the transfer of the file from the sender device to the receiver device via the server may be limited by the connection speed of the server's network.

To address challenges with security arising from transferring files via public networks and increase in network complexity from using a server, the present systems and methods provide a secure authentication mechanism for offline sharing of files. Both the sender device and the receiver device may initially be connected to the server via a public or other network (e.g., the Internet). For a sender device to send the file to the receiver device, the sender device may authenticate with the server. The sender device may provide the server an identifier for the receiver device (e.g., an email address for a user of the receiver device). The sender device may also generate an asymmetric key pair including a private key and a public key, and may send the public key to the server. Using the public key and the identifier for the receiver device received from the sender device, the server may generate a session token, and may transmit the session token to both the sender device and the receiver device via the public network. The server may also send the public key to the receiver device.

Upon receipt of the session token, the sender device and the receiver device may each disconnect from the public network and can establish an ad hoc network (e.g., P2P network) to transfer the file. To initiate the establishment of the ad hoc network, the receiver device may parse a received message comprising the session token to identify the public key. The receiver device may generate a service set identifier (SSID) for the ad hoc network (e.g., in accordance with Wi-Fi direct), and may append the public key identified from the session token to the SSID. The receiver device may then broadcast the SSID appended with the public key. In parallel, having disconnected from the public network, the sender device may search or discover for ad hoc networks. When the SSID appended with the public key is received by the sender device, the sender device may decrypt the SSID appended with the public key using the local copy of the private key. Once decrypted, the sender device may connect with the receiver device via the ad hoc network. The sender device and the receiver device may each perform an authentication handshake by exchanging and/or comparing copies of the session token received from the server. If the copies of the session tokens match, the sender device and the receiver device may each determine that the authentication is successful. Once authenticated, the sender device may commence sending of the file to the receiver device. After completion of the transfer of the file, the receiver device may terminate broadcasting the ad-hoc network, thereby disconnecting from the sender device. As the ad hoc network is used to complete the transfer of files, the files may be transferred at high speeds relative to speeds attainable via public networks such as the Internet.

Figure 2:
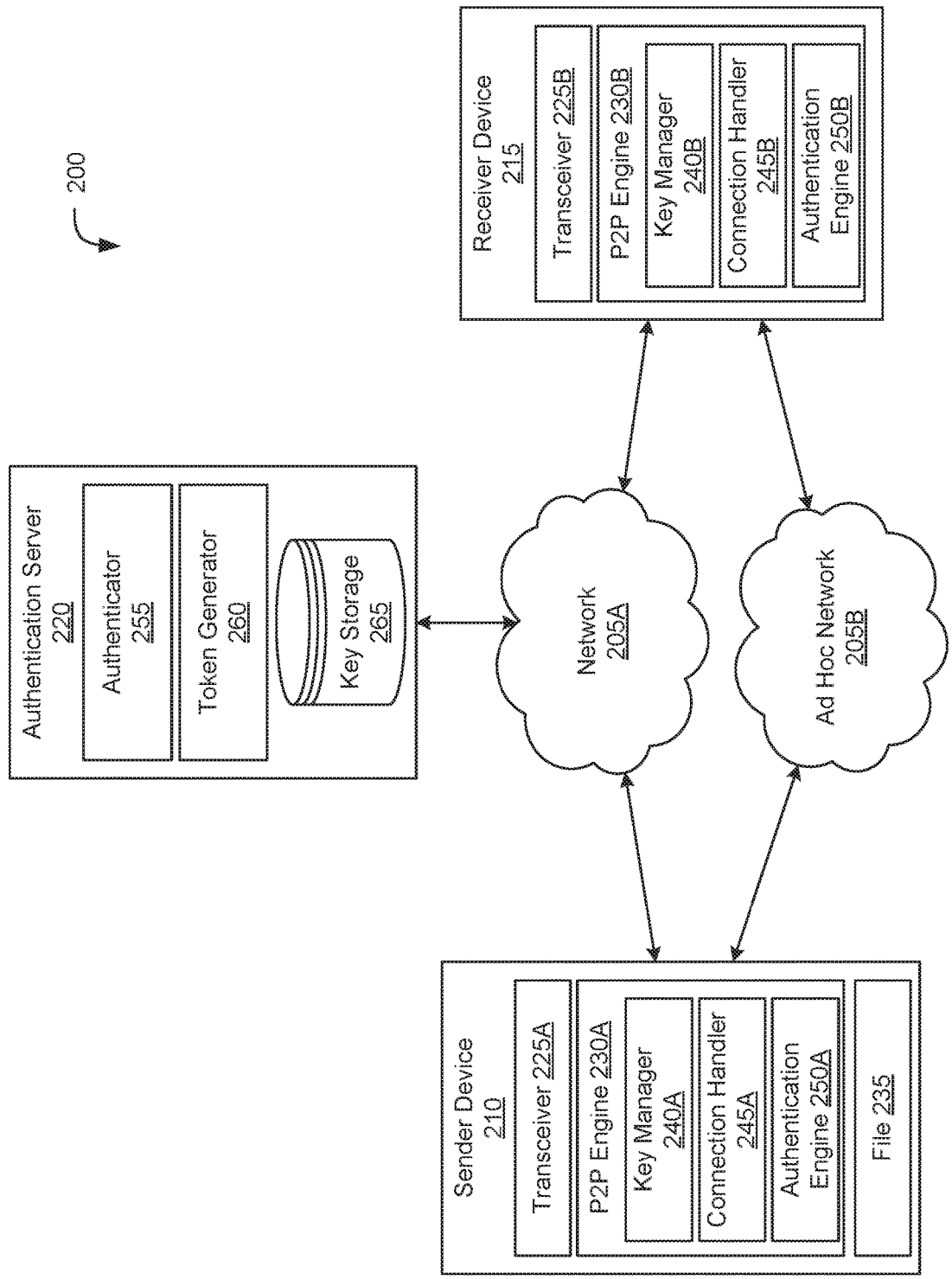
FIG. 2 is a block diagram of an example embodiment of a system for transferring files.

Referring now to FIG. 2, depicted is a block diagram of a system 200 for authenticated transfer of files. In overview, the system 200 may include a network 205A, an ad hoc network 205B, a sender device 210, a receiver device 215, and an authentication server 220. The sender device 210 may include a transceiver 225A, a peer-to-peer (P2P) engine 230A, and a file 235 to be sent to the receiver device 215. The P2P engine 230A may include a key manager 240A, a connection handler 245A, and an authentication engine 250A. The receiver device 215 may include a transceiver 225B and a P2P engine 230B. The P2P engine 230B may include a key manager 240B, a connection handler 245B, and an authentication engine 250B. The authentication server 220 may include an authenticator 255, a token generator 260, and a key storage 265.

Each of the above-mentioned elements or entities is implemented in hardware, or a combination of hardware and software, in one or more embodiments. Each component of the system 200 may be implemented using hardware or a combination of hardware or software detailed above in connection with FIG. 1. For instance, each of these elements or entities can include any application, program, library, script, task, service, process or any type and form of executable instructions executing on hardware of the sender device 210 including the transceiver 225A, the P2P engine 230A, and the file 235, the receiver device 215 including the transceiver 225B and the P2P engine 230B, or the authentication server 220 including the authenticator 255, the token generator 260 and the key storage 265. The hardware includes circuitry such as one or more processors in one or more embodiments.

The sender device 210 and the receiver device 215 may be physically proximate to one another (e.g., within 10 meters of each other, or some other distance). In some embodiments, a user of the sender device 210 may electronically or verbally communicate with a user of the receiver device 215, and vice-versa. For example, the user of the receiver device 215 may orally indicate a request for transferring the file 235 from the sender device 210 to the receiver device 215. The users of the sender device 210 and the receiver device 215 may interact with the input/output (I/O) devices. The P2P engine 230A (e.g., including the key manager 240A, the connection handler 245A, and/or the authentication engine 250A) installed and running on the sender device 210 may facilitate sending of the file 235 from the sender device 210 to the receiver device 215 in the manner detailed herein. The P2P engine 230B (e.g., including the key manager 240B, the connection handler 245B, and/or the authentication engine 250B) installed and running on the receiver device 215 may also facilitate the receipt of the file 235 from the sender device 210 in the manner detailed herein.

To initiate sending, transfer, copying or sharing of the file 235 from the sender device 210 to the receiver device 215, the transceiver 225A of the sender device 210 may connect to the network 205A, which can be an intranet, the Internet or other type of network (e.g., local or wide area network). In some embodiments, the sender device 210 may receive a user input from an input/output (I/O) device (e.g., a keyboard, a mouse, or a touchscreen interaction with a graphical user interface). In some embodiments, the user input may correspond to a command to transfer the file 235 to the receiver device 215. In some embodiments, the user input may correspond to a command to connect with the network 205A. In some embodiments, the user input may include authentication credentials for the user of the sender device 210 to login with the authentication server 220. In response to the user interaction, the transceiver 225A may initiate the connection with the network 205A. The transceiver 225A may also connect with the authentication server 220 via the network 205A. In addition, the sender device 210 may be authenticated with the authentication server 220 using the authentication credentials received via the user input.

Initially, both the sender device 210 and the receiver device 215 may be connected to the authentication server 220 via the network 205A. Prior to, concurrent with, or subsequent to the connection of the sender device 210 with the network 205A, the transceiver 225B of the receiver device 215 may also connect with the network 205A. In some embodiments, the receiver device 215 may receive a user input from an input/output (I/O) device (e.g., a keyboard, a mouse, or a touchscreen interaction with a graphical user interface). In some embodiments, the user input may correspond to a command to receive the file 235 from the sender device 210. In some embodiments, the user input may correspond to a command to connect with the network 205A. In some embodiments, the user input may include authentication credentials for the user of the receiver device 215 to login with the authentication server 220. In response to the user interaction, the transceiver 225B may initiate the connection with the network 205A. The transceiver 225B may also connect with the authentication server 220 via the network 205A. In addition, the sender device 210 may be authenticated with the authentication server 220 using the authentication credentials received via the user input.

The network 205A may be connected to the sender device 210, the receiver device 215, and the authentication server 220, among other devices. The network 205A may be any type of network capable of facilitating communications among the sender device 210, the receiver device 215, and the authentication server 220 with one another. In some embodiments, the transceiver 225A of the sender device 210 may communicate via the network 205A, wirelessly or via a wired connection. In some embodiments, the transceiver 225B of the receiver device 215 may communicate via the network 205A, wirelessly or via a wired connection. In some embodiments, the network 205A may be a public network (e.g., the Internet). In some embodiments, the public network may be part of a cloud-based service (e.g., Infrastructure as a Service (IaaS), Platform as a Service (PaaS), and Software as a Service). The cloud-based service can include the authentication server 220 as a cloud-based server (e.g., a virtual private server (VPS)). In some embodiments, the network 205A may be a private network (e.g., Intranet) accessible to the sender device 210, the receiver device 215, and the authentication server 220. In some embodiments, the private network may be a local area network (LAN) or a wide area network (WAN).

In connection with establishing communications with the authentication server 220, the key manager 240A may generate a key pair for authenticated communications. The key pair may include a private key and a public key for encrypting and decrypting communications. In some embodiments, the key manager 240A may use an asymmetric cryptography algorithm (e.g., elliptic curve algorithm, Rivest-Shamir-Adleman (RSA) algorithm, and Secure Hash Algorithm (SHA)) to generate the key pair. In some embodiments, the key manager 240A may generate the key pair in response to the user input indicating the command to send the file 235 stored on the sender device 210 to the receiver device 215 or the command to connect with the network 205A. In some embodiments, the key manager 240A may request a certificate authority (CA) with the public key to issue a digital certificate assigning the public key to the sender device 210. Once generated, the key manager 240A may store the key pair (including the public key and the private key) onto memory of the sender device 210. In some embodiments, the key manager 240A may also store the digital certificate along with the key pair onto the memory of the sender device 210.

Once connected with the network 205A, the key manager 240A of the sender device 210 may send an identifier for the receiver device 215 and the public key to the authentication server 220 via the network 205A. The identifier for the receiver device 215 and the public key may be sent via the transceiver 225A and the network 205A. In some embodiments, the identifier for the receiver device 215 and the public key may be part of a request to initiate transfer of file(s), sent by the key manager 240A. The identifier for the receiver device 215 may include any set of alphanumeric characters to uniquely label or identify the receiver device 215. The identifier for the receiver device 215 may be an email address, an account identifier, an Internet Protocol (IP) address, a Media Access Control (MAC) address, and a device serial number for the receiver device 215, among others. In some embodiments, the sender device 210 may receive the identifier for the receiver device 215 from the input/output device. The identifier for the receiver device 215 may be part of the user input to command to send the file 235 or to connect with the network 205A. The public key may be from the key pair generated by the key manager 240A using an asymmetric cryptography algorithm. In some embodiments, the key manager 240A may also transmit the digital certificate assigning the public key to the sender device 210, to the authentication server 220.

Upon receipt of the identifier for the receiver device 215 and the public key from the sender device 210 via the network 205A, the authenticator 255 of the authentication server 220 may authenticate the sender device 210 and/or the receiver device 215. The authenticator 225 may authenticate the sender device 210 and/or the receiver device 215 using the identifier for the receiver device 215 and the public key. In authenticating the sender device 210, the authenticator 255 may compare the identifier for the receiver device 215 sent by the sender device 210 with one or more identifiers for the receiver device 215 retrieved or accessed from the receiver device 215. In some embodiments, the authenticator 255 may send a request for identifiers to the receiver device 215. The receiver device 215 may in response identify, select, generate and/or provide the one or more identifiers for the receiver device 215, such as an email address, an account identifier, an Internet Protocol (IP) address, a Media Access Control (MAC) address, and a device serial number for the receiver device 215, among others. Once identified/selected/generated, the receiver device 215 may send a response including the one or more identifiers of the receiver device 215 to the authenticator 255. The authenticator 255 may in turn receive the one or more identifiers from the receiver device 215. Upon receipt, the authenticator 255 may compare the identifier for the receiver device 215 sent by the sender device 210 with the one or more identifiers for the receiver device 215 retrieved from the receiver device 215.

If the identifier for the receiver device 215 sent by the sender device 210 is determined to not match any of the identifiers received from the receiver device 215, the authenticator 255 may determine that the authentication of the sender device 210 and the receiver device 215 is unsuccessful. In some embodiments, the authenticator 255 may end the initiation of the transfer of the file 235. In some embodiments, the authenticator 255 may send a message indicating failure of authentication to the sender device 210 and/or the receiver device 215. The key manager 240A of the sender device 210 in turn may send another identifier for the receiver device 215. The key manager 240B of the receiver device 215 may also send another set of identifiers for the receiver device 215 itself. With the receipt of the identifiers for the receiver device 215 from the sender device 210 and the receiver device 215, the authenticator 255 may repeat the authentication process. On the other hand, if the identifier for the receiver device 215 sent by the sender device 210 is determined to match one of the identifiers for the receiver device 215, the authenticator 255 may determine that the authentication of the receiver device 215 is successful.

In addition, the authenticator 255 may also use the public key generated by the sender device 210 to authenticate the sender device 210. In some embodiments, the authenticator 255 may send a query to the certificate authority including the public key to verify that the public key is assigned to the sender device 210. The certificate authority may have previously assigned the public key to the sender device 210, and may maintain a list of assignments for public keys. The certificate authority in response to the query may check the public key against a local data base. The certificate authority may send a response indicating whether the public key is valid and assigned to the sender device 210. Based on the response from the certificate authority, the authenticator 255 may authenticate the sender device 210. If the response indicates that the public key is valid and that the public key is assigned to the sender device 210, the authenticator 255 may determine that the authentication of the sender device 210 is successful.

On the other hand, if the response indicates that the public key is no longer valid (e.g., revoked) or that the public key is assigned to another device besides the sender device 210, the authenticator 255 may determine that the authentication of the sender device 210 is unsuccessful. The authenticator 255 may also end the initiation of the transfer of the file 235. In some embodiments, the authenticator 255 may send a message indicating failure at authentication to the sender device 210. The key manager 240A of the sender device 210 in turn may generate a key pair using the asymmetric cryptography algorithm. The key manager 240A may also request the certificate authority to issue another digital certificate. The key manager 240A may in turn send the public key and the digital certificate to the authenticator 255. The authenticator 255 may repeat the authentication process using the new public key and digital certificate.

In some embodiments, the authenticator 255 may authenticate the sender device 210 using the digital certificate. In some embodiments, the authenticator 255 may receive the digital certificate along with the identifier for the receiver device 215 and the public key generated by the sender device 210. The digital certificate may have been signed or generated by the certificate authority in assigning the public key to the sender device 210. The authenticator 255 may send a query to the certificate authority including the digital certificate to verify that the proper certificate authority issued the digital certificate for the public key generated by the sender device 210. The certificate authority in turn may check the digital certificate against the local database. The certificate authority may send a response indicating whether the digital certificate was issued by the certificate authority. Based on the response from the certificate authority, the authenticator 255 may authenticate the sender device 210. If the response indicates that the public key is valid and that the public key is assigned to the sender device 210, the authenticator 255 may determine that the authentication of the sender device 210 is successful. In some embodiments, the authenticator 255 may maintain the key storage 265. The authenticator 255 may store the public key and the identifier for the receiver device 215 onto the key storage 265, when both the sender device 210 and the receiver device 215 are successfully authenticated. The public key and the identifier for the receiver device 215 may be indexed on the key storage 265 by an identifier for the sender device 210.

On the other hand, if the response indicates that the digital certificate was not issued by the certificate authority, the authenticator 255 may determine that the authentication of the sender device 210 is unsuccessful. In some embodiments, the authenticator 255 may end the initiation of the transfer of the file 235. In some embodiments, the authenticator 255 may send a message indicating failure at authentication to the sender device 210. The key manager 240A of the sender device 210 in turn may generate key pair using the asymmetric cryptography algorithm. The key manager 240A may also request the certificate authority to issue another digital certificate. The key manager 240A may in turn send the public key and the digital certificate to the authenticator 255. The authenticator 255 may repeat the authentication process using the new public key and digital certificate.

With the authentication of the sender device 210 and the receiver device 215, the token generator 260 of the authentication server 220 may generate a session token (sometimes referred to as a "session identifier"). The session token may uniquely identify communications (or a communication session) between the sender device 210 and the receiver device 215, e.g., for the transfer of the file 235 from the sender device 210 to the receiver device 215. The session token may include a set of alphanumeric characters or a numeric value, among others, to uniquely identify the communications for the transfer of the file 235 from the sender device 210 to the receiver device 215. In some embodiments, the token generator 260 may use a pseudo-random number generator to create the session token. The pseudo-random number generator may be used to generate the set of alphanumeric characters and/or the numeric value for the session token. Upon generation of the session token, the token generator 260 may send the session token to the sender device 210 via the network 205A. The token generator 260 may send the session token to the receiver device 215 via the network 205A. The token generator 260 may also send the public key generated by the sender device along with the session token to the receiver device 215 via the network 205A. In some embodiments, the token generator 260 may maintain the key storage 265. The token generator 260 may store the public key, the identifier for the receiver device 215, and/or the session token for the sender device 210 and the receiver device 215 onto the key storage 265. The public key, the identifier for the receiver device 215, and/or the session token may be indexed on the key storage 265 by an identifier for the sender device 210.

Subsequent to sending the identifier for the receiver device 215 and the public key, the connection handler 245A of the sender device 210 may wait for receipt of the session token from the authentication server 220. The connection handler 245A of the sender device 210 may receive the session token from the authentication server 220 via the network 205A. In some embodiments, the connection handler 245A may wait for receipt of the session token for a predetermined time limit elapsed from sending of the identifier for the receiver device 215 and the public key. If the session token is not received within the predetermined time limit, the connection handler 245A may resend the public key and the identifier for the receiver device 215. Otherwise, the connection handler 245A of the sender device 210 may receive the session token from the authentication server 220 via the network 205A within the predetermined time limit. In response to receiving the session token, the connection handler 245A may disconnect from the network 205A. In some embodiments, the connection handler 245A may disconnect from the network 205A, when the session key is successfully decrypted using the private key. In some embodiments, the connection handler 245A may send a message to the authentication server 220 via the network 205A indicating that the sender device 210 is to be disconnected from the network 205A, prior to disconnecting. In some embodiments, the connection handler 245A may remain connected to the network 205A.

Additionally, the connection handler 245B of the receiver device 215 may receive the session token from the authentication server 220 via the network 205A. Receipt of the session token from the authentication server 220 may trigger the receiver device 215 to initiate the P2P engine 230B. In some embodiments, the connection handler 245B may wait for receipt of the session token for a predetermined time limit elapsed from sending of the one or more identifiers for the receiver device 215. If the session token is not received within the predetermined time limit, the connection handler 245B may resend the one or more identifiers for the receiver device 215. Otherwise, the connection handler 245B may receive the session token from the authentication server 220 via the network 205A within the predetermined time limit. In response to receiving the session token, the connection handler 245B may disconnect from the network 205A. In some embodiments, the connection handler 245B may send a message to the authentication server 220 via the network 205A indicating that the sender device 210 is to be disconnected from the network 205A, prior to disconnecting. In some embodiments, the connection handler 245B may remain connected to the network 205A.

After disconnecting from the network 205A (or while connected to the network 205A), the connection handler 245B of the receiver device 215 may initiate establishment of the ad hoc network 205B using the transceiver 225B. In some embodiments, the transceiver 225A of the sender device 210 may communicate via the ad hoc network 205B (sometimes referred to as a peer-to-peer (P2P) network or connection). In some embodiments, the transceiver 225B of the receiver device 215 may communicate via the ad hoc network 205B. The ad hoc network 205B may be any type of network capable of facilitating direct communications between the sender device 210 and the receiver device 215. In some embodiments, the ad hoc network 205B may be established using the Near-Field Communication (NFC) protocol. In some embodiments, the ad hoc network 205B may be a single-hop network, such as a peer-to-peer (P2P) wireless network. The peer-to-peer wireless network may be in accordance with various protocols, including Wi-Fi Direct protocol, Juxtapose (JXTA) protocol, Bluetooth Standard, Open Garden protocol, Gnutella protocol, G2 protocol, and Direct Connect (DC) protocol, among others. In some embodiments, the ad hoc network 205B may be a multi-hop network, such as a mobile ad hoc network (MANET), a wireless ad hoc network (WANET), a wireless sensor network (WSN), a wireless mesh network (WMN), and a delay-tolerant network (DTN), among others. In some embodiments, the ad hoc network 205B may be formed using a wireless or wired connection between the sender device 210 and the receiver device 215. For example, a wired connection may be comprised of a USB-to-USB connection or a FireWire connection (in accordance with the IEEE 1394 standard).

In establishing the ad hoc network 205B, the connection handler 245B may generate a network key (sometimes referred to as a security key, a network security key, a network password, or a passphrase). The network key may represent or include authentication credentials or cryptographic information to establish communications with the receiver device 215 via the ad hoc network 205B. The network key may include a set of alphanumeric characters. The set of alphanumeric characters may be of a predefined length (e.g., up to 32 characters long). In some embodiments, the connection handler 245B may use a pseudo-random number generator to generate the set of alphanumeric characters for the network key. The connection handler 245B may then encrypt the network key using the public key generated by the sender device 210 and/or received from the authentication server 220. In some embodiments, the connection handler 245B may apply a cryptographic algorithm (e.g., elliptic curve algorithm, Rivest-Shamir-Adleman (RSA) algorithm, and Secure Hash Algorithm (SHA)) with the public key onto the network key to generate the encrypted network key.

Additionally, the connection handler 245B may identify, generate and/or provide a service set identifier (SSID) for the ad hoc network 205B. In some embodiments, the SSID may be in accordance with the 802.11 wireless local area (WLAN) standard. The SSID may include a set of alphanumeric characters for identifying the receiver device 215 and/or the ad hoc network 205B. The set of alphanumeric characters for the SSID may be of a predefined length (e.g., up to 32 characters long). In some embodiments, the SSID may include a predefined or default set of alphanumeric characters for the receiver device 215. In some embodiments, the connection handler 245B may generate the SSID specifically for the ad hoc network 205B to transfer the file 235 from the sender device 210. In some embodiments, the connection handler 245B may use a pseudo-random number generator to generate the set of alphanumeric characters for the SSID.

The connection handler 245B may append or attach the encrypted network key to the SSID. In some embodiments, the connection handler 245B may concatenate the encrypted network key with the SSID before the first character of the SSID or after the last character of the SSID. In some embodiments, the connection handler 245B may insert the encrypted network key in the SSID in a predefined set of indices. The connection handler 245B can broadcast the encrypted network key with or in association with the SSID (e.g., in a same or different portion of a broadcasted frame or packet). The encrypted network key accompanying the SSID may be of a predefined length (e.g., up to 32 characters long). The predefined length may be equal to the maximum length permitted by the 802.11 WLAN standard. In some embodiments, the connection handler 245B may truncate the SSID so that the length of the encrypted network key appended to the SSID may be of the predefined length. In some embodiments, the connection handler 245B may store the SSID, the network key, and/or the encrypted network key locally.

The connection handler 245B may broadcast the SSID appended with the encrypted network key to establish the ad hoc network 205B. In some embodiments, the connection handler 245B may transmit or broadcast the SSID appended with the encrypted network key via the transceiver 225B. In some embodiments, the connection handler 245B may transmit the SSID appended with the encrypted network key using the ad hoc network 205B. In some embodiments, the ad hoc network 205B formed by the connection handler 245B may broadcast the SSID appended with the encrypted network key. In some embodiments, the connection handler 245B may broadcast the SSID appended with the encrypted network key for a predetermined time limit to wait for completion of the establishing of the connection with the sender device 210. If the connection with the sender device 210 via the ad hoc network 205B is not established within the predetermined time limit, the connection handler 245B may terminate the initiation of the establishment of the ad hoc network 205B.

The connection handler 245A of the sender device 210 may detect the ad hoc network 205B established by the receiver device 215. In some embodiments, the connection handler 245A may discover or monitor for the ad hoc network 205B initiated by the receiver device 215. In some embodiments, the connection handler 245B may monitor for the SSID accompanied with the encrypted network key broadcasted by the receiver device 215. In some embodiments, the connection handler 245B may perform monitoring for a predetermined time limit. If the SSID appended with the encrypted network key is not received within the predetermined time limit, the connection handler 245A may terminate initiation of the transfer of the file 235. Otherwise, the connection handler 245A may receive the SSID appended with the encrypted network key.

Upon detection of the ad hoc network 205B, the connection handler 245A may obtain the network key broadcasted by the receiver device 215, by using the private key to decrypt. In some embodiments, the connection handler 245A may parse the SSID appended with the encrypted network key to identify the encrypted network key. In some embodiments, the connection handler 245A may identify the encrypted network key in front of the first character of the SSID or after the last character of the SSID, using the predefined length of the encrypted network key and the predefined length of the SSID. In some embodiments, the connection handler 245A may identify the encrypted network key at the predefined set of indices within the SSID. Having identified, extracted or parsed out the encrypted network key, the connection handler 245A may identify the SSID from the remaining set of alphanumeric characters. With the identification of the encrypted network key, the connection handler 245A may decrypt the encrypted network key using the private key to obtain the network key. In some embodiments, the connection handler 245A may apply the cryptographic algorithm with the private key onto the encrypted network key to obtain the network key.

Using the network key obtained from the SSID appended to the encrypted network key, the connection handler 245A of the sender device 210 may connect the sender device 210 to the ad hoc network 205B. To connect to the ad hoc network 205B established by the receiver device 215, the connection handler 245A may transmit or send the network key via the ad hoc network 205B to the receiver device 215. In some embodiments, the connection handler 245A may send the network key along with the SSID to connect to the ad hoc network 205B established by the receiver device 215. The connection handler 245B of the receiver device 215 in turn may receive the decrypted network key from the sender device 210. In some embodiments, the connection handler 245B may also receive the SSID along with the decrypted network key. To authenticate the sender device 210 for connecting with the ad hoc network 205B, the connection handler 245B may compare the decrypted network key from the sender device 210 with a local copy of the network key. If the network keys do not match, the connection handler 245B may prevent the sender device 210 from connecting to the ad hoc network 205B. In some embodiments, the connection handler 245B may also terminate the ad hoc network 205B. On the other hand, if the network key decrypted by the sender device 210 matches the local copy of the network key on the receiver device 215, the connection handler 245B may permit the sender device 210 to connect to the ad hoc network 205B. In some embodiments, the connection handler 245B may send a confirmation message to the sender device 210 indicating that the connection with the ad hoc network 205B is successful.

Once connected via the ad hoc network 205B, both the authentication engine 250A of the sender device 210 and the authentication engine 250B of the receiver device 215 may perform an authentication handshake to authenticate for the transfer of the file 235. In performing the authentication handshake, the authentication engine 250A of the sender device 210 and the authentication engine 250B of the receiver device 215 may exchange the session token via the ad hoc network 205B. In some embodiments, the authentication engine 250B of the receiver device 215 may send a local copy of the session token received from the authentication server 220 to the sender device 210. The authentication engine 250A of the sender device 210 may receive the copy of the session token from the receiver device 215. In some embodiments, the authentication engine 250A of the sender device 210 may send a local copy of the session token received from the authentication server 220 to the receiver device 215. The authentication engine 250B of the receiver device 215 may receive the copy of the session token from the sender device 210. In some embodiments, the sending of the local copy of the session token by the authentication engine 250A of the sender device 210 may be prior to, concurrent with, or subsequent to the sending of the local copy of the session token by the authentication engine 250B of the receiver device 215.

With receipt of the copy of the session token from the receiver device 215, the authentication engine 250A of the sender device 210 may compare the session token from the receiver device 215 with the local copy of the session token received from the authentication server 220. The comparison of the session tokens may be to verify or authenticate the receiver device 215 for transfer of the file 235. If the session token from the receiver device 215 is determined to not match the session token locally stored on the sender device 210, the authentication engine 250A may terminate or refuse the transfer of the file 235 to the receiver device 215. In some embodiments, the authentication engine 250A may disconnect the sender device 210 from the ad hoc network 205B, or terminate the ad hoc network 205B. On the other hand, if the session token from the receiver device 215 is determined to match the session token locally stored on the sender device 210, the authentication engine 250A may commence transfer of the file 235 to the receiver device 215.

Likewise, with the receipt of the copy of the session token from the sender device 210, the authentication engine 250B of the receiver device 215 may compare the session token from the sender device 210 with the local copy of the session token received from the authentication server 220. The comparison of the session tokens may be to verify or authenticate the sender device 210 for transfer of the file 235. If the session token from the sender device 210 is determined to not match the session token locally stored on the receiver device 215, the authentication engine 250B may terminate the ad hoc network 205B. On the other hand, if the session token from the sender device 210 is determined to match the session token locally stored on the receiver device 215, the authentication engine 250B may maintain the ad hoc network 205B. The authentication engine 250B may also wait for transfer of the file 235 from the sender device 210.

With the authentication of the sender device 210 in connecting to the ad hoc network 205B, the transceiver 225A of the sender device 210 may commence transfer of the file 235 stored on the sender device 210 to the receiver device 215 directly via the ad hoc network 205B. The file 235 may correspond to the command to transfer, received via the user input from the input/output device, as described previously. The transceiver 225A may send the file 235 to the receiver device 215 via the ad hoc network 205B. In some embodiments, the transceiver 225A may send data packets corresponding to subset portions of data constituting the file 235 via the ad hoc network 205B. In some embodiments, the transceiver 225A may maintain the local copy of the file 235 stored on the sender device 210 while sending the file 235 to the receiver device 215. In some embodiments, the transceiver 225A may delete constituent subset portions of the local copy of the file 235, as the file 235 is sent to the receiver device 215. The transceiver 225B of the receiver device 215 may in turn receive file 235 from the sender device 210 via the ad hoc network 205B. In some embodiments, the transceiver 225B may receive the data packets corresponding to the subset portions of data constituting the file 235 from the sender device 210 via the ad hoc network 205B.

When the transfer of the file 235 is complete, the transceiver 225A of the sender device 210 may disconnect from the ad hoc network 205B. In response to the disconnection by the sender device 210 from the ad hoc network 205, the transceiver 225B of the receiver device 215 may terminate the ad hoc network. In some embodiments, while transferring the file 235 via the ad hoc network 205B, the transceiver 225A of the sender device 210 may monitor a progress of the transfer. When the progress of the transfer of the file 235 from the sender device 210 to the receiver device 215 indicates completion, the transceiver 225A of the sender device 210 may disconnect with the ad hoc network 205B. In some embodiments, the transceiver 225B of the receiver device 215 may also monitor the progress of the transfer. In some embodiments, the data packets may include a sequence number indicating the subset portion of the data constituting the file 235. Using the sequence number, the transceiver 225B may determine the progress of the transfer. The transceiver 225B may also determine whether the transfer of the file 235 is complete based on the sequence number. When the transfer of the file 235 is determined to be complete, the transceiver 225B of the receiver device 215 may terminate the ad hoc network 205B.

In this manner, the file 235 may be transferred at a quicker rate through the ad hoc network 205B than via the network 205A, while preserving secure communications between the sender device 210 and the receiver device 215. The connection speed with the ad hoc network 205B may be faster than the connection speed of the network 205A, and may reach up to 250 megabytes per second for instance, or even higher. Furthermore, as the sender device 210 and the receiver device 215 authenticated with one another, the sender device 210 and the receiver device 215, the ad hoc network 205B, and the file 235 may be less vulnerable to security breaches.

Figure 3:
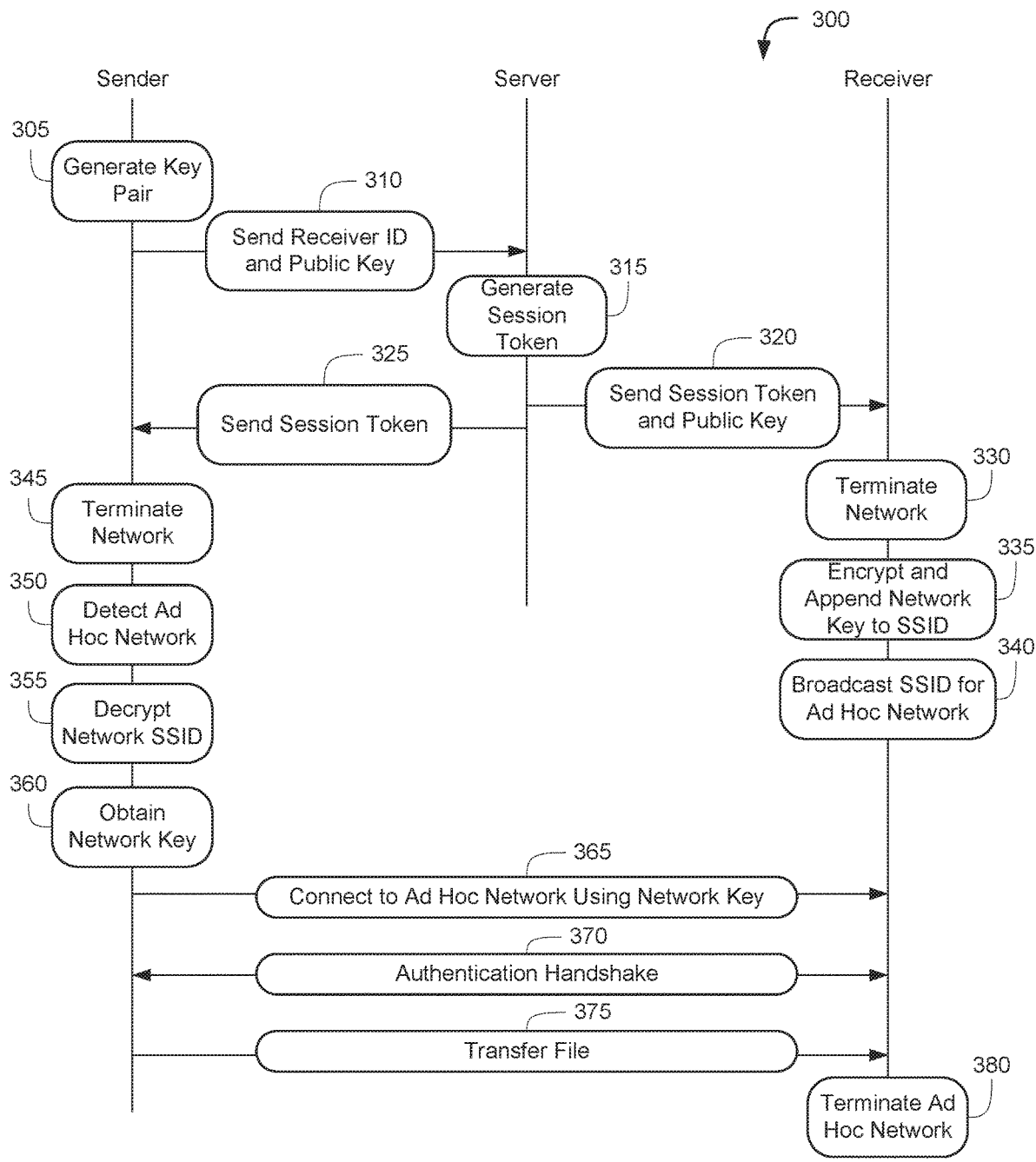
FIG. 3 is an example sequence diagram for an embodiment of a system for transferring files.

Referring to FIG. 3, depicted is an example sequence diagram of a method 300 for authenticated transferring of files. The operations and functionalities of the method 300 may be performed by the components described in FIG. 1 and FIG. 2, the system 100, and/or the system 200 including the sender device 210, the receiver device 215, and the authentication server 220 detailed above. A sender device may generate a key pair including a private key and a public key (305). The sender device may send a receiver identifier and the public key via a network (310). The server may generate a session key (315). The server may send the session key and the public key generated by the sender to the receiver via the network (320). The server may also send the session key to the sender (325). The receiver in turn may terminate the network connection with the server (330). The receiver may encrypt a network key using the public key and append the encrypted network key to a service set identifier (SSID) (335). The receiver may broadcast the SSID with the encrypted network key to initiate establishment of an ad hoc network (e.g., a peer-to-peer network) (340). The sender may also terminate the network connection with the server (345). The sender may detect the SSID for the ad hoc network broadcasted by the receiver (350). The sender may decrypt the SSID for the ad hoc network using the private key (355). The sender may obtain the network key from the decryption of the SSID (360). The sender may connect to the ad hoc network using the network key (365). The sender and the receiver may perform an authentication handshake (370). Upon successful authentication between the sender and the receiver, the sender may transfer a file to the receiver (375). When the transfer is complete, the receiver may terminate the ad hoc network (380).

Figure 4A:
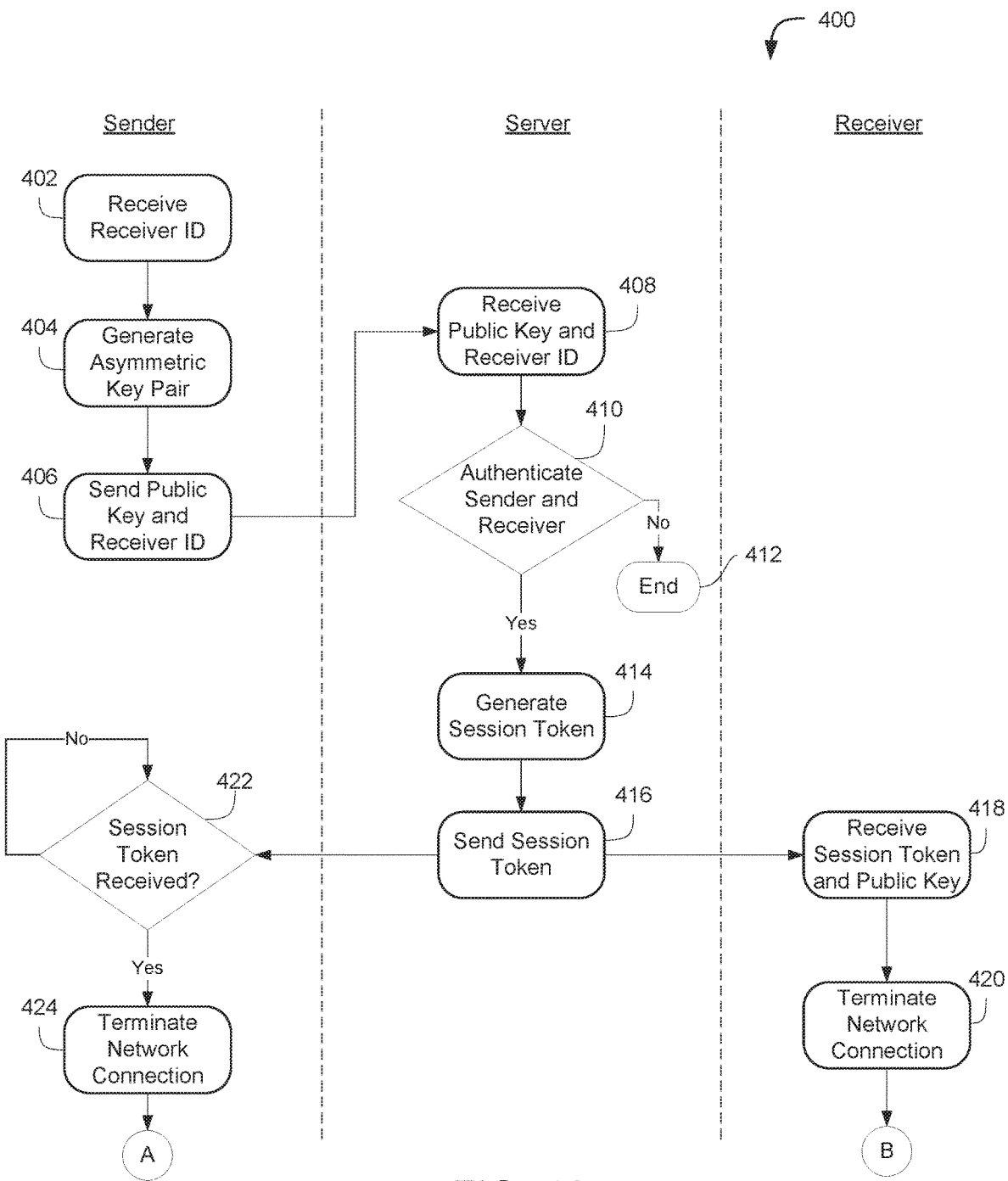
FIGS. 4A-4C include functional flow diagrams of an example embodiment of a method for transferring files.
Figure 4B:
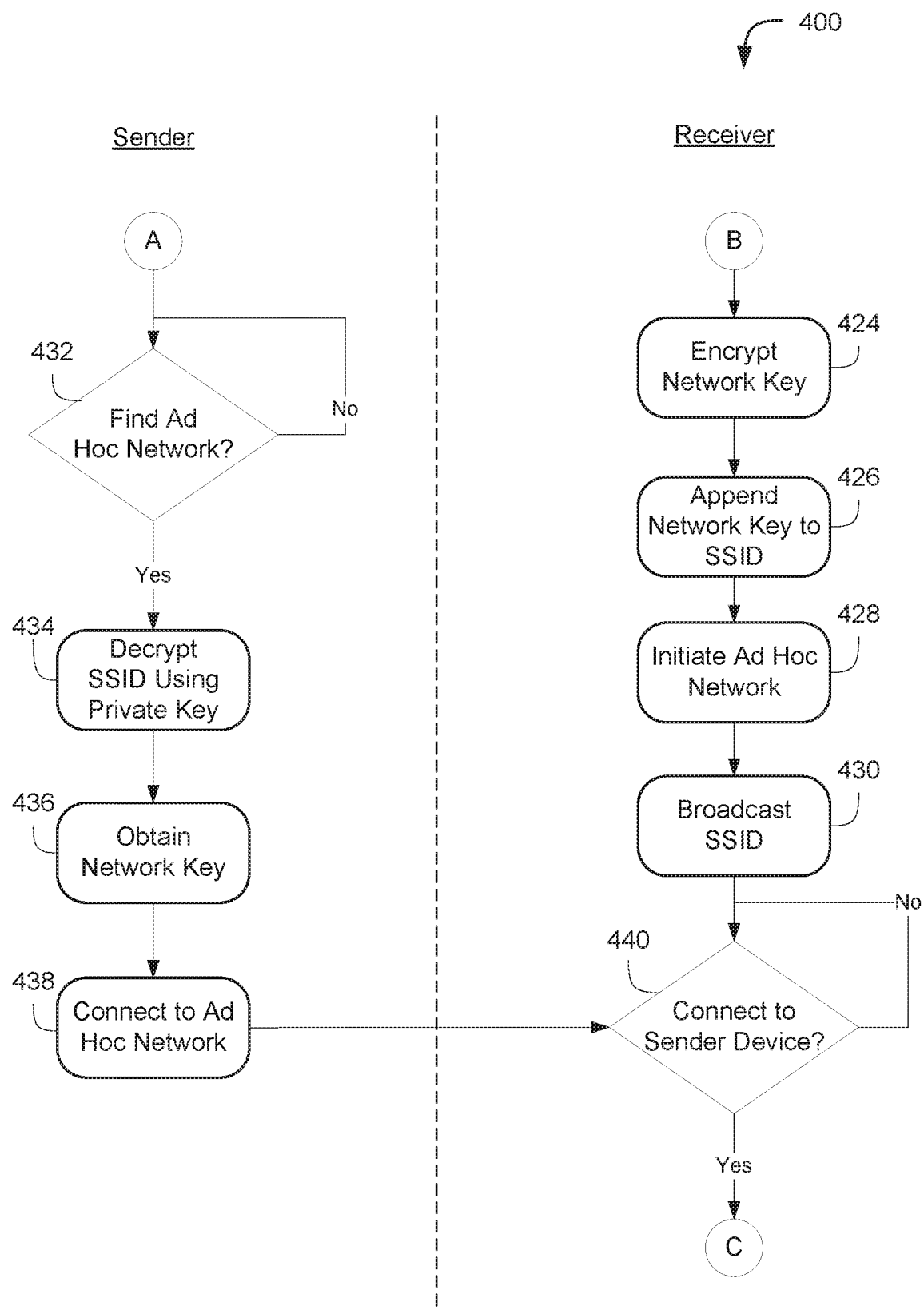
Figure 4C:
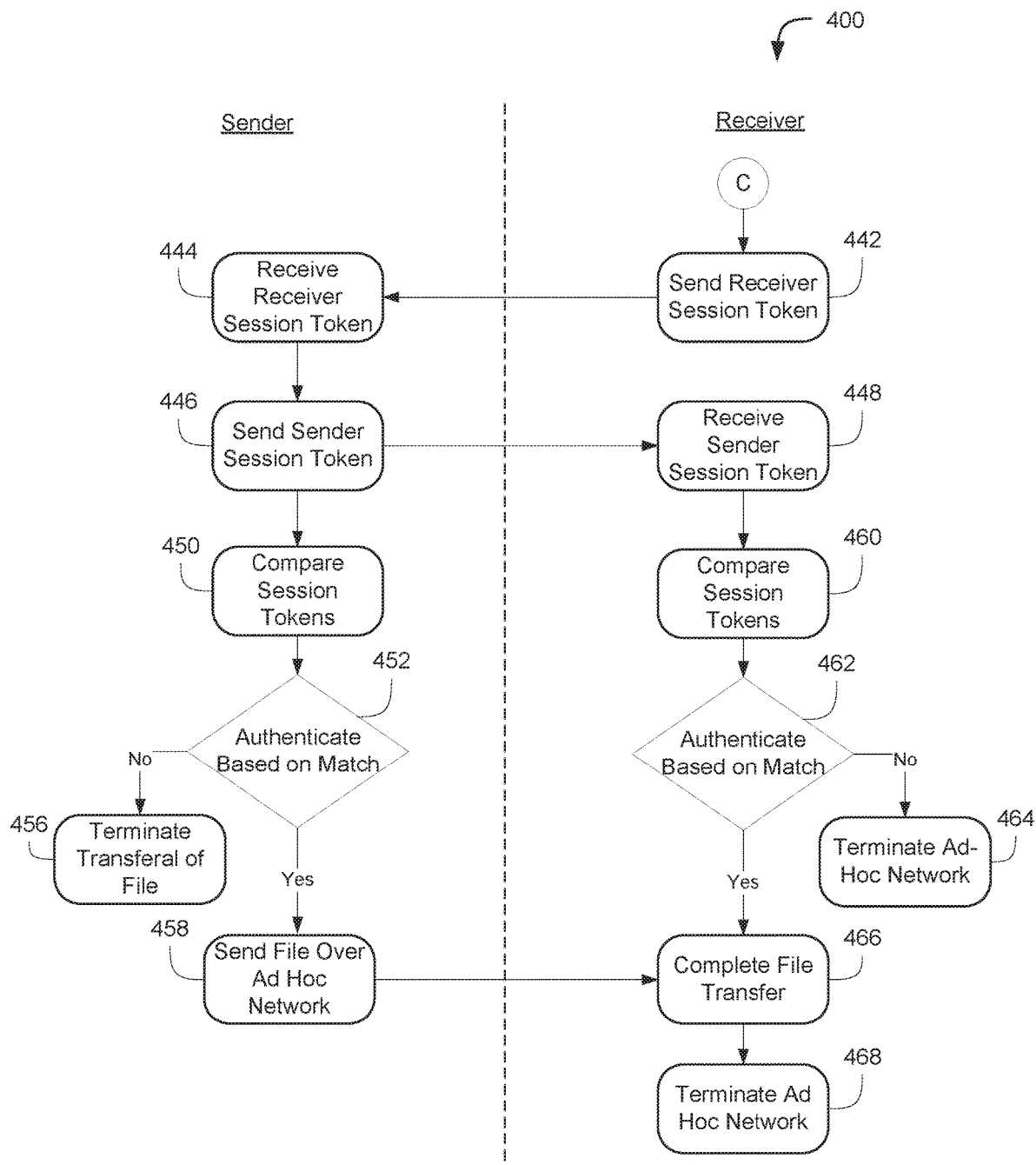

Referring to FIGS. 4A-4C, depicted is a functional band diagram (or flow diagrams) of an example method 400 for authenticated transferring files. The operations and functionalities of the method 400 may be performed by the components described in FIG. 1 and FIG. 2, the system 100, and/or the system 200 including the sender device 210, the receiver device 215, and the authentication server 220 detailed above. First referring to FIG. 4A, a sender may receive a receiver identifier (402). The sender may generate an asymmetric key pair including a private key and a public key (404). The sender may send the public key and the receiver identifier to a server via a network connection (406). The server in turn may receive the public key and the receiver identifier from the sender (408). The server may determine whether the sender and the receiver are successfully authenticated (410). If the authentication is unsuccessful, the server may terminate the process of transfer (412). In contrast, if the authentication is successful, the server may generate a session token (414). The server may send the session token to both the sender and a receiver via the network connection (416). The receiver may receive the session token and the public key (418). The receiver may terminate the network connection with the server (420). In the meanwhile, the sender may wait for receipt of the session token (422). When the session token is received, the sender may also terminate the network connection with the server (424).

Referring now to FIG. 4B, the receiver may encrypt a network key using the public key generated by the sender (424). The receiver may append or add the network key to a service set identifier (SSID) broadcast (426). The receiver may initiate establishment of an ad hoc network (e.g., a peer-to-peer network) (428). The receiver may broadcast the SSID with the network key for establishing the ad hoc network (430). Simultaneously, the sender may wait to find the ad hoc network (432). When the ad hoc network is detected, the sender may decrypt the SSID with the appended network key using the private key (434). The sender may obtain the network key from the decryption (436). The sender may initiate connection to the ad hoc network using the network key (438). The receiver may wait for connection with the sender via the ad hoc network (440).

Referring now to FIG. 4C, once the sender and the receiver are connected via the ad hoc network, both the sender and receiver may perform an authentication handshake. The receiver may send a local copy of the session token to the sender (442). The sender may receive the receiver's the copy of the session token from the receiver (444). The sender may send a local copy of the session token to the receiver (446). The receiver may receive the sender's local copy of the session token from the sender (448). The sender may compare the session token copies (450). The sender may determine whether the receiver is authenticated based on the match between the copies of the session tokens (452). If session tokens do not match, the sender may terminate transfer of the file (456). If the session tokens do match, the sender may send the file over the ad hoc network (458). The receiver may compare the copies of the session token (460). The receiver may determine whether the sender is authenticated based on the match between the copies of the session tokens (462). If the session tokens or copies do not match, the receiver may terminate the ad hoc network (464). If the session tokens or copies do match, the receiver may receive the file from the sender and complete the transfer of the file (466). Once the file transfer is complete, the receiver may terminate the ad hoc network (468).

Figure 5:
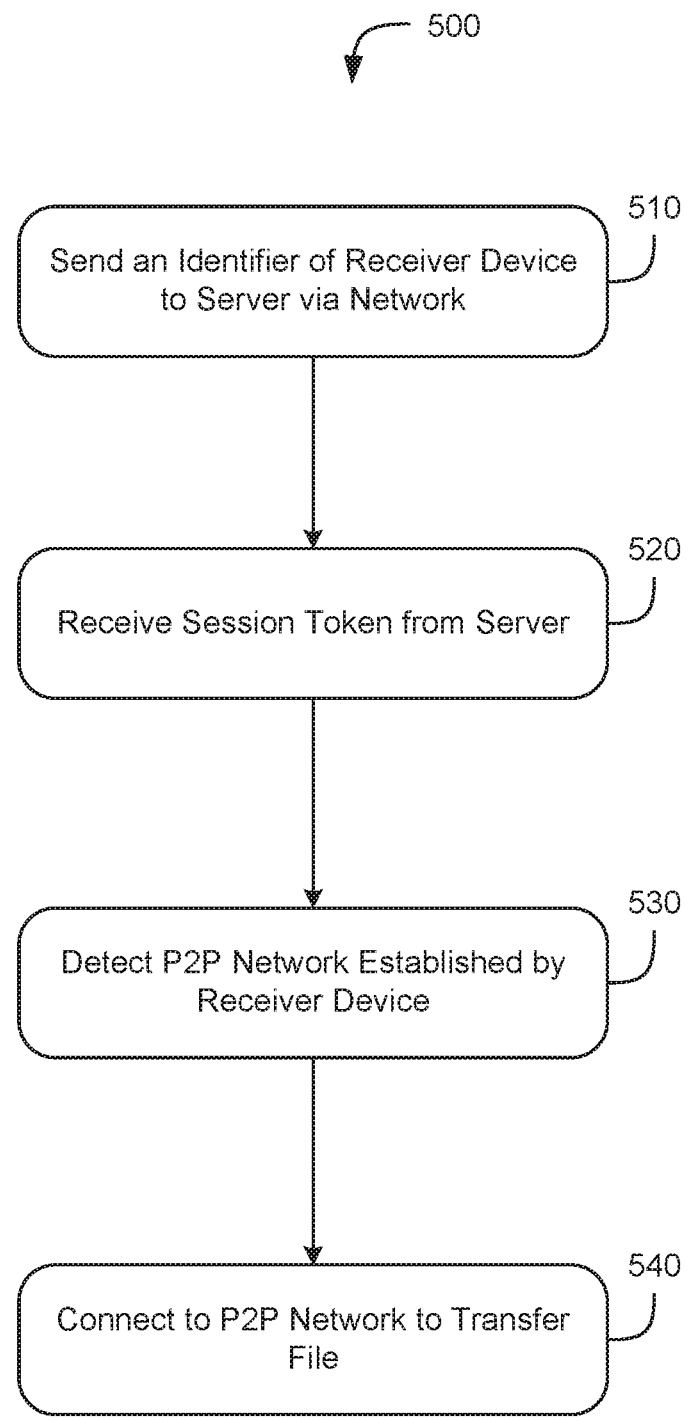
FIG. 5 is a flow diagram of an embodiment for a method of transferring files.

Referring to FIG. 5, depicted is a flow diagram of a method 500 for authenticated transferring files. The operations and functionalities of the method 500 may be performed by the components described in FIG. 1 and FIG. 2, the system 100, and/or the system 200 including the sender device 210, the receiver device 215, and the authentication server 220 detailed above. The sender device may send an identifier of a receiver device to a server via a network (510). The sender device may receive a session token from the server (520). The sender device may detect a peer-to-peer (P2P) network established by the receiver device (530). The sender device may connect to the P2P network to transfer the file (540).

In further detail, the sender device may send an identifier of a receiver device to a server via a network (510). The identifier for the receiver device may include any set of alphanumeric characters or numerical value to uniquely identify the receiver device. The network may be a public network, such as the Internet. The sender device may also send a public key with the identifier of the receiver device. The public key may be generated by the sender device with a private key using an symmetric cryptograph algorithm to encrypt and decrypt messages exchanged between the sender device and the receiver device. The sender device may also send the public key to a certificate authority to issue a digital certificate assigning the public key to the sender device.

The sender device may receive a session token from the server (520). Upon receipt of the identifier of the receiver device and the public key, the server may authenticate the sender device and/or the receiver device for transfer of the file from the sender device to the receiver device. If successfully authenticated, the server may generate the session token, and may provide the session token to both the sender device and the receiver device via the network. The server may also send the public key to the receiver device, along with the session token. When the session token is received, the sender device and the receiver device may both terminate communications with the server and may disconnect from the network.

The sender device may detect a peer-to-peer (P2P) network established by the receiver device (530). In establishing the P2P network, the receiver device may broadcast a service set identifier (SSID) appended with an encrypted network key. The network key may represent authentication credentials for signing onto the P2P network. The receiver device may encrypt the network key using the public key generated by the sender device and received from the server. The receiver device may then append or add the encrypted network key to the S SID' s broadcast. The sender device may detect the P2P network by receiving the SSID appended or accompanied with the encrypted network key broadcasted by the receiver device.

The sender device may connect to the P2P network to transfer the file (540). Upon detection of the P2P network, the sender device may parse the SSID appended with the encrypted network key to obtain the encrypted network key. The sender device may decrypt the encrypted network key using the private key generated using an asymmetric cryptographic algorithm. The sender device may connect to the P2P network by sending the network key obtained from the SSID appended with the encrypted network key to the receiver device. Once connected, the sender device and the receiver device may perform an authentication handshake procedure by exchanging the session token received from the server. Upon successful authentication, the sender device may transfer the file via the P2P network to the receiver device. When the file transfer is complete, the sender device may disconnect from the P2P network and the receiver device may terminate the P2P network.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for transferring a file, the method comprising:
   sending, by a sender device configured to transfer a file to a receiver device, an identifier of the receiver device and a public key of the sender device to a server via a first network that connects at least the sender device, the server and the receiver device;
   receiving, by the sender device via the first network, a session token from the server;
   detecting, by the sender device after receiving the session token, broadcast information indicating a peer-to-peer (P2P) wireless network established by the receiver device, wherein the broadcast information comprises a service set identifier (SSID) and a network key encrypted using the public key; and
   connecting, by the sender device and based on decrypting at least a portion of the broadcast information using a private key of the sender device to obtain the network key from the SSID, to the P2P wireless network to transfer the file to the receiver device via the P2P wireless network.

2. The method of claim 1, further comprising generating, by the sender device, a key pair comprising the public key and the private key.

3. The method of claim 1, further comprising receiving, by the sender device, the session token from the server responsive to the sender device and the receiver device being authenticated with the server.

4. The method of claim 1, further comprising causing the server to generate the session token and to send the session token to the sender device and the receiver device, by sending the identifier of the receiver device and the public key to the server.

5. The method of claim 1, further comprising disconnecting, by the sender device and based on receiving the session token, from the first network.

6. The method of claim 1, further comprising authenticating, by the sender device with the receiver device using the session token, responsive to connecting to the P2P wireless network.

7. The method of claim 1, further comprising transferring, by the sender device responsive to authenticating with the receiver device, the file to the receiver device via the P2P wireless network.

8. The method of claim 1, further comprising terminating the P2P wireless network upon completion of the transfer of the file from the sender device to the receiver device.

9. The method of claim 1, wherein the first network comprises an Internet and the P2P wireless network comprises a Wi-Fi Direct network.

10. A system for transferring a file, the system comprising:
    a transceiver of a sender device, the sender device configured to transfer a file to a receiver device; and
    a peer-to peer (P2P) engine executable on the sender device, the P2P engine configured to:
       send, using the transceiver, an identifier of the receiver device and a public key of the sender device to a server via a first network that connects at least the sender device, the server and the receiver device;
       receive, using the transceiver via the first network, a session token from the server;
       detect, after receiving the session token, broadcast information indicating a P2P wireless network established by the receiver device, wherein the broadcast information comprises a service set identifier (SSID) and a network key encrypted using the public key; and connect, based on decrypting at least a portion of the broadcast information using a private key of the sender device to obtain the network key from the SSID, the sender device to the P2P wireless network to transfer the file to the receiver device via the P2P wireless network.

11. The system of claim 10, wherein the P2P engine is further configured to generate a key pair comprising the public key and the private key.

12. The system of claim 10, wherein the transceiver is configured to receive the session token from the server responsive to the sender device and the receiver device being authenticated with the server.

13. The system of claim 10, wherein the P2P engine is further configured to cause the server to generate the session token and to send the session token to the sender device and the receiver device, by sending the identifier of the receiver device and the public key to the server.

14. The system of claim 10, wherein the P2P engine is further configured to disconnect, based on receiving the session token, the sender device from the first network.

15. The system of claim 10, further comprising an authentication engine executable on the sender device, the authentication engine configured to authenticate the sender device with the receiver device using the session token, responsive to the sender device connecting to the P2P wireless network.

16. The system of claim 10, wherein the transceiver is configured to transfer, responsive to the sender device authenticating with the receiver device, the file to the receiver device via the P2P wireless network.

17. The system of claim 10, wherein the P2P wireless network is terminated upon completion of the transfer of the file from the sender device to the receiver device.

18. The system of claim 10, wherein the first network comprises an Internet and the P2P wireless network comprises a Wi-Fi Direct network.

* * * * *